…

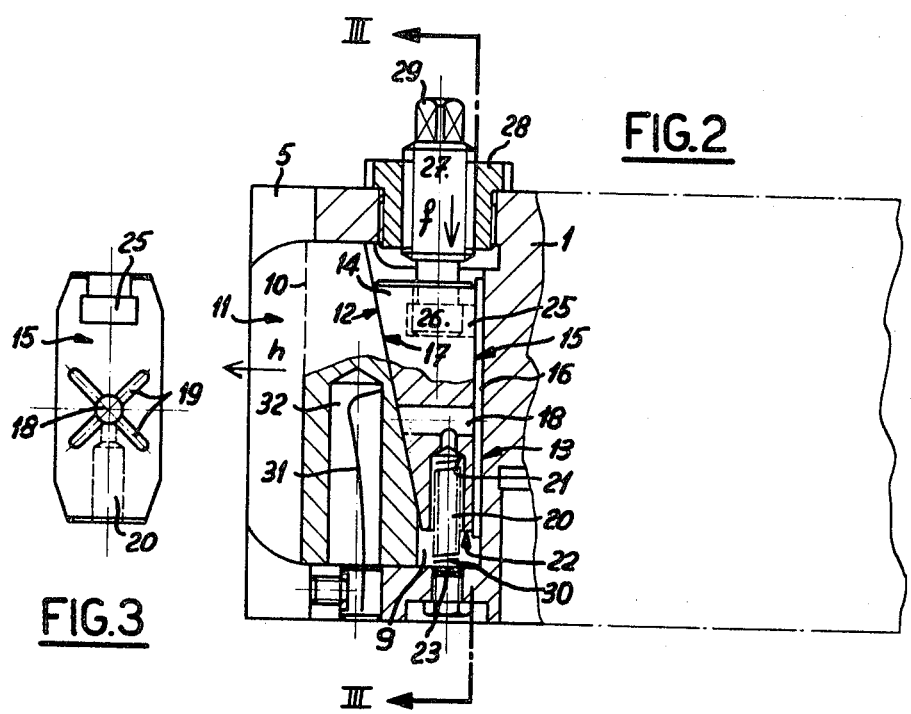

3,455,191
CLAMPING DEVICE OF A PART OF A MACHINE ON ANOTHER PART OF SAID MACHINE

Marcel Graf, Lully, Switzerland, assignor to Prematex S.A., Morges, Switzerland, a corporation of Switzerland
Filed Apr. 5, 1967, Ser. No. 628,702
Claims priority, application Switzerland, Apr. 15, 1966, 5,523/66
Int. Cl. B23b 29/00
U.S. Cl. 82—36                   11 Claims

ABSTRACT OF THE DISCLOSURE

This locking device of a universal tool-carrier, comprising a body provided with a dovetail on which a chisel-carrier is engaged, on a machine-tool slide comprises a piston linearly displaceable with respect to the said body, the free end of which presents a face which is parallel to one of the faces of the dovetail. This piston is displaced with respect to the said body by means of a driving device comprising a wedge located between the rear face of the piston and a face provided on the body as well as means for displacing this wedge with respect to the body and to the piston along a direction which is perpendicular to the direction of movement of this piston.

---

The present invention concerns locking devices of a machine-tool part on another, which may be adapted to a machine-tool table, a rectilinear or circular movable slide, as well as to tool-carriers having quickly interchangeable head.

The present invention concerns more particularly locking devices for universal tool-carriers, that is to devices enabling the mounting of a chisel-carrier on a tool-carrier. More particularly, the present invention concerns locking devices for tool-carriers the chisel-carrier of which is mounted by means of a dovetail assembly on this tool-carrier, and which in tightened position or locked position enables to apply three faces of this chisel-carrier on three faces of the tool-carrier.

The present invention has thus for its object a locking device for a universal tool-carrier, comprising a body provided with a dovetail on which a chisel-carrier is engaged, this locking device comprising a piston linearly displaceable with respect to the said body, and the free end of which shows a face which is parallel to one of the surfaces of the dovetail, which is characterized by the fact that this piston is displaced linearly with respect to the said body by means of an actuating device which comprises a wedge located between a rear face of the piston and a face provided in the body, as well as means to displace this wedge with respect to the body and to the piston along a direction perpendicular to the direction of displacement of this piston.

The attached drawing shows schematically and by way of example two embodiments and variants of the locking device according to the invention.

FIGURE 2 is a partial view, partially in cross-section, from A of FIGURE 1.

FIGURE 3 is a cross-section along the line III—III of FIGURE 2.

Figure 1:
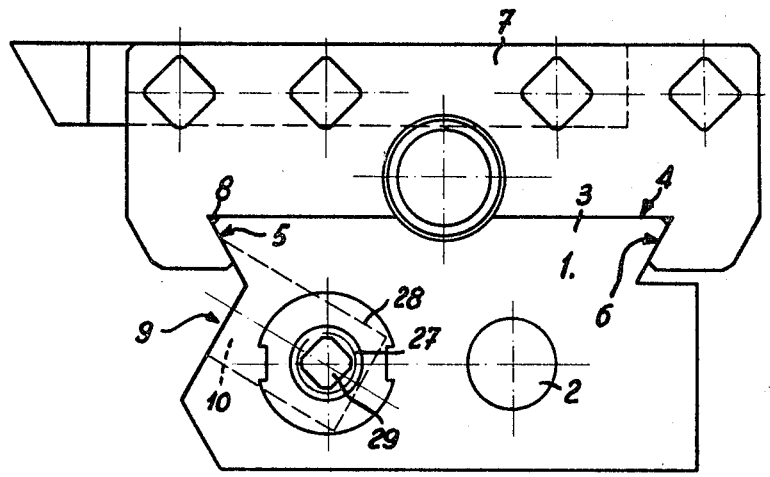
FIGURE 1 is a plan view of a tool-carrier provided with the locking device according to the invention.

With reference to FIGURES 1 to 3, the tool-carrier comprises a body 1 provided with a bore 2 enabling to fix this body on a member of a machine-tool for example. This body 1 presents a dovetail 3 comprising a frontal surface 4 and two lateral surfaces 5, 6 forming an acute angle with this frontal surface 4.

The tool-carrier shown comprises further a chisel-carrier 7 comprising a housing 8 the shape of which corresponds, in transversal cross-section, to the one of the dovetail 3. A chisel is fixed in any known manner on this chisel-carrier 7.

The dimensions of the dovetail 3 and of the housing 8 are such that the chisel-carrier 7 is able to displace freely on the body 1 of the tool-carrier.

In order to fix rigidly the chisel-carrier 7 on the body 1 of the tool-carrier, this latter comprises a locking device which will be described hereunder in more details.

This locking comprises, slidably mounted without clearance inside a untrue milling 9 provided in the body 1, a piston 10. One of the sides of this milling 9 is located in the immediate vicinity of the summit of one of the lateral faces 5 of the dovetail 3 and its axis extends parallelly to the bisector plane between the frontal face 4 and the lateral face 5 of the dovetail 3 and perpendicularly to the edge constituted by the intersection of this lateral face 5 and of this frontal face 4.

This piston presents a frontal free face 11 parallel to the lateral face 5 of the dovetail 3 which is positioned, in retracted position or rest position of the piston 10, in the plane of the lateral face 5 or within the milling 9.

The frontal rear face 12 of the piston 10 is located in a plane perpendicular to the flat lateral faces of the milling 9 and forms an angle comprised between 70 and 90° with the axis of said milling 9.

The bottom 13 of the milling 9 on the contrary is constituted by a cross-section of it and is thus perpendicular to its axis.

The locking device comprises further a wedge 14 one of the faces 15 of which bears, through the intermediary of a plate 16 rectified on both faces, against the bottom 13 of the milling 9, whereas the other 17 is intended to enter in contact with the frontal rear face 12 of the piston 10.

This wedge comprises further a bore 18 having an axis parallel to the one of the milling 9 and opening on both faces 15, 17 by means of slots 19. This bore 18 is connected by means of a bore 20 comprising, in the example shown, a shoulder 21 to the little frontal face 22 of the wedge 14 inside the body 1.

The great frontal face 24 of the wedge 14 is provided with a T-shaped groove 25 the axis of which is parallel to the axis of the milling 9 and which is intended to receive the T-shaped end 26 of a tightening screw 27 having a trapezoidal thread engaged in a nut 28 fastened on the body 1 along an axis perpendicular to the axis of the milling 9. The free end of this screw 27 presents an actuating member 29 which is for example of square shape.

At least, a spring 30 is located within the bore 20 and rests on the one hand against the flange of the milling 9 and on the other hand on the shoulder 21 of the bore 20. This spring tends to displace the wedge 14 in an inactive or rest position.

The locking device comprises further a blade spring 31 one end of which is rigidly mounted on the body 1 and the other end of which extends within a dead hole 32 provided in the piston 10 and tends to displace this piston towards the wedge 14.

The working of the described device is the following:

In rest position, the screw 27 is untightened and the wedge is pushed back against this screw by means of its spring 30. The piston 10 is completely located within the milling 9 thanks to the action of the blade spring 31, which maintains it in contact with the wedge 14.

The operator places then the chisel-carrier 7 on the dovetail 3 in the desired position, tightens then the screw 27 by means of the actuating member 29. The tightening of this screw 27 displaces the wedge 14 against the action of its spring 30 in the direction of the arrow *f*, which causes in its turn a displacement of the piston 10 in the direction of the arrow *h*, which has for effect to apply strongly the frontal free face 11 of this piston against the lateral face of the housing 8 of the chisel-carrier corresponding to the lateral face 5 of the body 1, causing thus the locking of this chisel-carrier 7 on the body 1.

It is to be noted that when the bottom of the milling 9 and thus the bores 20 and 18 are full of grease under pressure, the lubrication of the wedge surfaces is automatically ensured. Furthermore, due to the pressure of the grease, this tends to escape out of the locking device and avoids the penetration of any dust, turnings, scraps and so on, which is necessary for the good working of the described device.

In variants, it is of course possible to suppress the spring 30 and/or the blade spring 31, without modifying the principle of the working of the device. In fact, the displacements of the wedge 14 are positively ensured in both directions through the screw 27 thanks to the coupling of this screw with the wedge 14.

In a preferred embodiment, one determines the conicity of the wedge 14 in such a manner that it realizes with the piston 10 a self-locking assembly. In this way, the screw 27 is not submitted to the efforts caused by the machining and the jerks occurring at the beginning of the machining. This characteristic is quite important and enables to realize a locking device which cannot be untightened under the effect of vibrations or trepidations of the machine during the machining. This important character is made possible thanks to the fact that the wedge 14 is positively controlled in both its directions of displacement.

It is further obvious that the locking device can be adapted on any tool-carrier comprising a chisel-carrier assembled by means of a dovetail to the body of the tool-carrier.

As seen above, the main advantages of the locking device described are the following:

(a) the obtention of a quick tightening,
(b) the obtention of a quick positioning,
(c) the fact that it is not untightened by the effect of vibrations,
(d) the fact that it is not necessary to lock the position of the screw 27, the device being self-locking.

Figure 4:
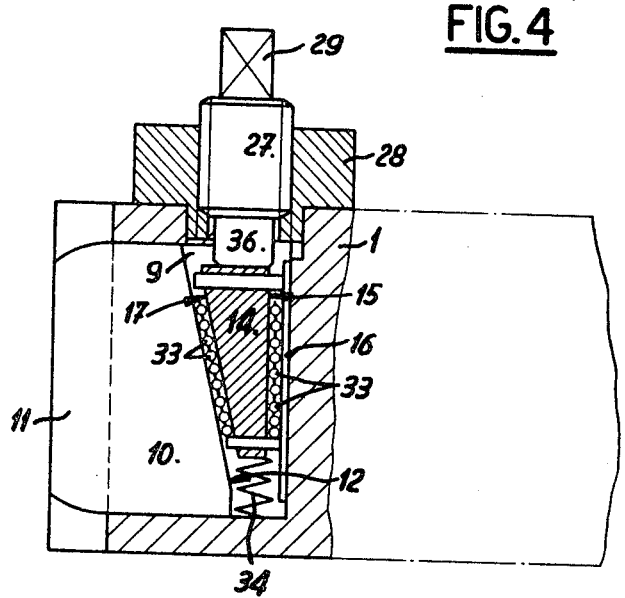
FIGURE 4 shows a second embodiment of the locking device.

In the modification shown in FIGURE 4, the locking device is not self-locking and the wedge 14 bears on the frontal rear face 12 of the piston 10 and on the plate 16 through the intermediary of needles 33.

In this embodiment, the wedge 14 is submitted to the action of a return spring 34, tending to apply the great frontal face of this wedge 14 against an abutment 36 which forms the end of the screw 27.

The working of this embodiment is similar to the one of the already described embodiment, so that it will not be described here again.

It is obvious that in a modification, the wedge 14 could be mounted by means of needles as in the second embodiment, but still being coupled to the screw 27 as in the first embodiment.

Figure 5:
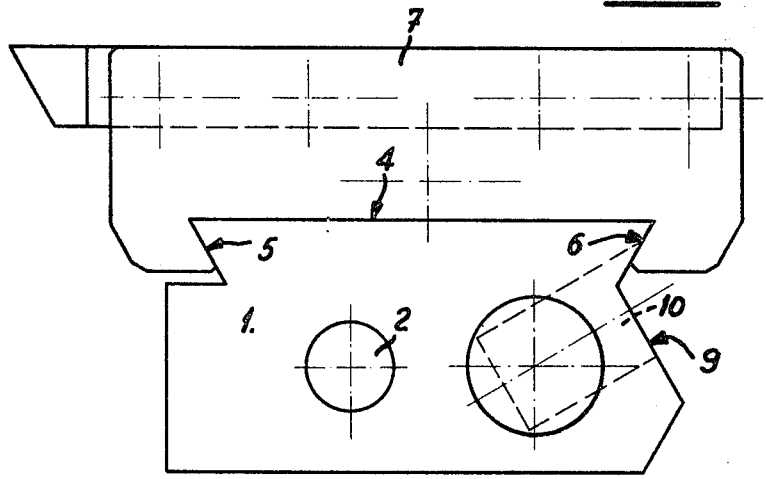
FIGURE 5 shows a variant of the locking device illustrated in FIGURES 1 to 3.

Further, as shown in FIGURE 5, it is obvious that the locking device could be combined with the lateral face 6 of the dovetail 3 and not with the lateral face 5 of it. In fact, one can realize a front locking, on the surface 5, or a rear locking, on the surface 6, as it is desired.

The locking device has been described with reference to a tool-carrier, but it is evident that this locking device may be used in a general manner for the fixing of a machine member with respect to another, and may be adapted particularly to the table of a machine-tool, to a rectilinear or circular movable slide, as well as to any kind of tool-carriers.

I claim:

1. A device for locking a machine tool-carrier on a tool-carrier body provided with dovetailed shaped engaging surfaces, said device comprising a one-piece piston provided in a bore located in said body and displaceable with respect to said body to engage said tool-carrier, said piston including outer and inner ends, said outer end having a face parallel to one of the lateral faces of said dovetailed shaped engaging surfaces and coextensive with a major portion thereof, said inner end having a wedge engaging face; a wedge provided in said body and located between the inner end of said piston and the bottom of said bore; and control means for displacing said wedge with respect both to said body and to said piston along a direction perpendicular to the direction of displacement of said piston, said control means including a screw attached to said wedge and secured to said body, the longitudinal axis of said screw being parallel to the direction of a displacement of said wedge, said screw having a trapezoidal thread and being threaded through a nut fixed on said body of the tool-carrier, whereby said control means linearly displaces said piston with respect to said body to lock said tool-carrier on said body.

2. A device according to claim 1 in which one of the faces of the wedge is in direct contact with inner end of the piston.

3. A device according to claim 2 in which other face of the wedge is in contact with the bottom of said bore through the intermediary of a hardened and rectified steel plate.

4. A device according to claim 1 in which one of the faces of said wedge is in contact with the inner end of said piston by means of needles.

5. A device according to claim 4 in which the other face of the wedge is in contact with a plate located at the bottom of said bore through the intermediary of needles.

6. A device according to claim 1 in which said wedge is biased to a resilient return action by spring means located along said longitudinal axis of said screw.

7. A device according to claim 1 in which said piston is biased to a resilient return action tending to apply it against said wedge.

8. A device according to claim 1 in which said screw is connected to another end of said wedge by means of a T-shaped slot coupling.

9. A device according to claim 1 in which said piston further includes lubricating bore means for housing lubricant and for putting lubricant under pressure in said bore.

10. A device according to claim 9 in which said lubricating bore means communicates with the inner end of said piston and the bottom of said bore in said body.

11. A device according to claim 10 in which said lubricating bore means includes radial slots for distributing said lubricant.

References Cited

UNITED STATES PATENTS 1,286,309   12/1918   Hawley _____ 82—36 X

FOREIGN PATENTS 486,812   9/1952   Canada.

LEONIDAS VLACHOS, Primary Examiner